United States Patent
Yu et al.

(10) Patent No.: US 10,940,477 B2
(45) Date of Patent: Mar. 9, 2021

(54) FLUID SAMPLE COLLECTION AND RETRIEVAL APPARATUS AND MICROFLUIDIC CHIP

(71) Applicant: MiCareo Taiwan Co., Ltd., Taipei (TW)

(72) Inventors: Hui-Min Yu, Taipei (TW); Jui-Lin Chen, Taipei (TW); Wei-Feng Fang, Taipei (TW)

(73) Assignee: MiCareo Taiwan Co., Ltd., Taipei (TW)

(*) Notice: Subject to any disclaimer, the term of this patent is extended or adjusted under 35 U.S.C. 154(b) by 298 days.

(21) Appl. No.: 16/039,331

(22) Filed: Jul. 19, 2018

(65) Prior Publication Data

US 2020/0023362 A1    Jan. 23, 2020

(51) Int. Cl.
*B01L 3/00* (2006.01)

(52) U.S. Cl.
CPC ... *B01L 3/502761* (2013.01); *B01L 3/502746* (2013.01); *B01L 2200/0652* (2013.01); *B01L 2300/0864* (2013.01); *B01L 2400/084* (2013.01)

(58) Field of Classification Search
CPC ......... B01L 3/502761; B01L 3/502746; B01L 3/5027; B01L 3/502; B01L 3/50
USPC .......................................... 422/502, 500, 50
See application file for complete search history.

(56) References Cited

U.S. PATENT DOCUMENTS

| | | | |
|---|---|---|---|
| 2008/0213821 A1 | 9/2008 | Liu et al. | |
| 2008/0261295 A1 | 10/2008 | Butler | |
| 2010/0028928 A1* | 2/2010 | Levchenko | B01L 7/00 435/29 |
| 2010/0029014 A1 | 2/2010 | Wang | |

(Continued)

FOREIGN PATENT DOCUMENTS

| | | |
|---|---|---|
| CN | 104140926 | 11/2014 |
| EP | 2408562 | 1/2012 |
| JP | 2014029327 | 2/2014 |

(Continued)

OTHER PUBLICATIONS

"Office Action of Japan Counterpart Application," dated Oct. 15, 2019, p. 1-p. 2.

(Continued)

*Primary Examiner* — Christine T Mui
(74) *Attorney, Agent, or Firm* — JCIPRNET

(57) ABSTRACT

In accordance with some embodiments, a fluid sample collection and retrieval apparatus including a microfluidic chip, a retrieval tube, a first switch, a second switch and a processor is provided. The microfluidic chip includes a first sample channel, a first fluid directing channel assembly, a first confluence chamber, a first collection channel, a first waste channel, and a retrieval hole. The retrieval hole passes through an outer surface of the microfluidic chip. The retrieval tube is connected to the retrieval hole. The first switch is connected to the microfluidic chip. The second switch is attached to the retrieval tube. The processor is configured to activate the first switch to operate the flow (Continued)

adjustment of the first fluid directing channel assembly and activate the second switch to operate a sample collection in the first collection channel within duration of operating the flow adjustment of the first fluid directing channel assembly.

16 Claims, 8 Drawing Sheets

(56) References Cited

U.S. PATENT DOCUMENTS

2014/0262787 A1  9/2014  Molho
2018/0326419 A1* 11/2018  Yu .................... B01L 3/502761

FOREIGN PATENT DOCUMENTS

| JP | 2015522247 | | 8/2015 | | |
|---|---|---|---|---|---|
| TW | 200726838 | | 7/2007 | | |
| WO | WO 2010/106434 | * | 9/2010 | ............... | B01L 3/00 |
| WO | 2010144814 | | 12/2010 | | |

OTHER PUBLICATIONS

"Office Action of Taiwan Counterpart Application", dated May 2, 2019, pp. 1-3.
Search Report of Europe Counterpart Application, dated Dec. 3, 2018, p. 1-p. 8.
"Office Action of Europe Counterpart Application", dated Oct. 27, 2020, p. 1-p. 4.

* cited by examiner

US 10,940,477 B2

FLUID SAMPLE COLLECTION AND RETRIEVAL APPARATUS AND MICROFLUIDIC CHIP

BACKGROUND

Technical Field

The present disclosure is related to the cell sorting field, and more particularly related to apparatuses for isolating, collecting, and retrieving biological cells from a body fluid.

Description of Related Art

Microfluidic chips have been used in various field, particularly, the bio-related field such as the biomedical, biochemical, or related field. In the application of the bio-related field, a blood sample is tested in the microfluidic chip. Usually, a blood sample contains various cells therein, and the need to sort rare cells is rapidly expanding. The rare target cells population may include circulating tumor cells (CTCs), hematopoietic stem cells (HSCs), and circulating fetal cells (CFCs) in the blood sample. The ability to isolate these rare cells with high purity and high recovery rates would represent significant advance in disease screening and monitoring. However, the commercial cell sorter has some limitation regarding sorting the rare cells population, including generally low selectivity, significant sample loss, and high operating pressures could result in a loss of function or viability for further analysis. Therefore, the microfluidic chips and related apparatus still require improvements to fulfill the medical demand.

SUMMARY

The disclosure provides a fluid sample collection and retrieval apparatus for retrieving the sorted sample in the microfluidic chip.

In accordance with some embodiments, a fluid sample collection and retrieval apparatus includes a microfluidic chip, a retrieval tube, a first switch, a second switch, and a processor. The microfluidic chip includes a first sample channel, a first fluid directing channel assembly, a first confluence chamber, a first collection channel, a first waste channel, and a retrieval hole. The first sample channel and the first fluid directing channel assembly are converged at a first side of the first confluence chamber. The first collection channel and the first waste channel are diverged from a second side of the first confluence chamber, wherein the first side and the second side are opposite sides. The retrieval hole passes through an outer surface of the microfluidic chip. The first collection channel forms a fluid communication between the retrieval hole and the first confluence chamber. The retrieval tube is connected to the retrieval hole. The first switch is connected to the microfluidic chip and configured to operate a flow adjustment of the first fluid directing channel assembly. The second switch is attached to the retrieval tube. The processor is configured to activate the first switch to operate the flow adjustment of the first fluid directing channel assembly and activate the second switch to operate a sample collection in the first collection channel within a duration of operating the flow adjustment of the first fluid directing channel assembly.

In accordance with some embodiments, the second switch is detachably attached to the retrieval tube.

In accordance with some embodiments, the first fluid directing channel assembly includes a first buffer channel, a second buffer channel, and a buffer adjustment hole passing through the outer surface of the microfluidic chip and in fluid communication of the first buffer channel. The first sample channel, the first buffer channel, and the second buffer channel are converged at the first side of the first confluence chamber. A joint of the first sample channel connecting to the first confluence chamber is positioned between a joint of the first buffer channel connecting to the first confluence chamber and a joint of the second buffer channel connecting to the first confluence chamber.

In accordance with some embodiments, a buffer adjustment tube (BAT) further connects to the buffer adjustment hole of the first fluid directing channel assembly, and the first switch is attached to the buffer adjustment tube.

In accordance with some embodiments, the microfluidic chip further includes a second sample channel, a second fluid directing channel assembly, a second confluence chamber, a second collection channel, a second waste channel, and a connection channel. The second sample channel and the second fluid directing channel assembly are converged at a first side of the second confluence chamber. The second collection channel and the second waste channel are diverged from a second side of the second confluence chamber, wherein the second side of the second confluence chamber is opposite to the first side of the second confluence chamber. The connection channel forms a fluid communication between the first sample channel and the second collection channel.

In accordance with some embodiments, the second fluid directing channel assembly comprises a first buffer channel, a second buffer channel, and a buffer adjustment hole passing through the outer surface of the microfluidic chip and in fluid communication of the first buffer channel. The second sample channel, the first buffer channel, and the second buffer channel are converged at the first side of the second confluence chamber. A joint of the second sample channel connecting to the second confluence chamber is positioned between a joint of the first buffer channel connecting to the second confluence chamber and a joint of the second buffer channel connecting to the second confluence chamber.

In accordance with some embodiments, a buffer adjustment tube further connects to the buffer adjustment hole of the second fluid directing channel assembly, and a third switch attached to the buffer adjustment tube.

In accordance with some embodiments, the first switch, the second switch, and the third switch are activated independently by the processor.

In accordance with some embodiments, the connection channel includes a plurality of longitudinal-particle-separation sections serially connected along an extending direction of the connection channel. Each of the longitudinal-particle-separation sections comprises at least one winding portion and at least one shortcut portion, wherein the winding portion and the shortcut portion are connected in parallel between two joints at opposite terminals of the each of the longitudinal-particle-separation sections, and the path length of the winding portion is greater than the path length of the shortcut portion.

The disclosure also provides another fluid sample collection and retrieval apparatus includes a microfluidic chip, a retrieval tube, a control tube, a first switch, a second switch, a third switch, and a processor. The microfluidic chip includes a first sample channel, a first fluid directing channel assembly, a first confluence chamber, a first collection channel, a first waste channel, a control hole, a retrieval channel, and a retrieval hole. The first sample channel and the first fluid directing channel assembly are converged at a first side of the first confluence chamber. The first collection channel and the first waste channel are diverged from a second side of the first confluence chamber, wherein the first side and the second side are opposite sides. The control hole passes through an outer surface of the microfluidic chip, wherein the first collection channel forms a fluid communication between the control hole and the first confluence chamber. The retrieval channel is branched from the first collection channel at a joint between the control hole and the first confluence chamber. The retrieval hole passes through the outer surface of the microfluidic chip, wherein the retrieval channel forms a fluid communication between the retrieval hole and the first collection channel. The retrieval tube is connected to the retrieval hole. The control tube is connected to the control hole. The first switch is connected to the microfluidic chip and configured to operate a flow adjustment of the first fluid directing channel assembly. The second switch is attached to the control tube. The third switch is attached to the retrieval tube. The processor is configured to activate the first switch to operate the flow adjustment of the first fluid directing channel assembly, activate the second switch to operate a sample collection in the first collection channel within a duration of operating the flow adjustment of the first fluid directing channel assembly, and activate the third switch to operate a sample retrieval after operating the sample collection in the first collection channel.

In accordance with some embodiments, the processor is further configured to stop activating the second switch during activating the third switch.

In accordance with some embodiments, the first fluid directing channel assembly comprises a first buffer channel, a second buffer channel, and a buffer adjustment hole passing through the outer surface of the microfluidic chip and in fluid communication of the first buffer channel. The first sample channel, the first buffer channel, and the second buffer channel are converged at the first side of the first confluence chamber. A joint of the first sample channel connecting to the first confluence chamber is positioned between a joint of the first buffer channel connecting to the first confluence chamber and a joint of the second buffer channel connecting to the first confluence chamber.

In accordance with some embodiments, a buffer adjustment tube connects to the buffer adjustment hole, and the first switch is attached to the buffer adjustment tube.

In accordance with some embodiments, the microfluidic chip further includes a second sample channel, a second fluid directing channel assembly, a second confluence chamber, a second collection channel, a second waste channel, and a connection channel. The second sample channel and the second fluid directing channel assembly are converged at a first side of the second confluence chamber. The second collection channel and the second waste channel are diverged from a second side of the second confluence chamber, wherein the first side of the second confluence chamber is opposite to the second side of the second confluence chamber. The connection channel forms a fluid communication between the first sample channel and the second collection channel.

In accordance with some embodiments, the second fluid directing channel assembly comprises a first buffer channel, a second buffer channel, and a buffer adjustment hole passing through the outer surface of the microfluidic chip and in fluid communication of the first buffer channel. The second sample channel, the first buffer channel, and the second buffer channel are converged at the first side of the second confluence chamber. A joint of the second sample channel connecting to the second confluence chamber is positioned between a joint of the first buffer channel connecting to the second confluence chamber and a joint of the second buffer channel connecting to the second confluence chamber. The fluid sample collection and retrieval apparatus further includes a buffer adjustment tube connecting to the buffer adjustment hole and a fourth switch attached to the buffer adjustment tube, wherein the processor is configured to activate the first switch, the second switch, the third switch, and the fourth switch independently.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
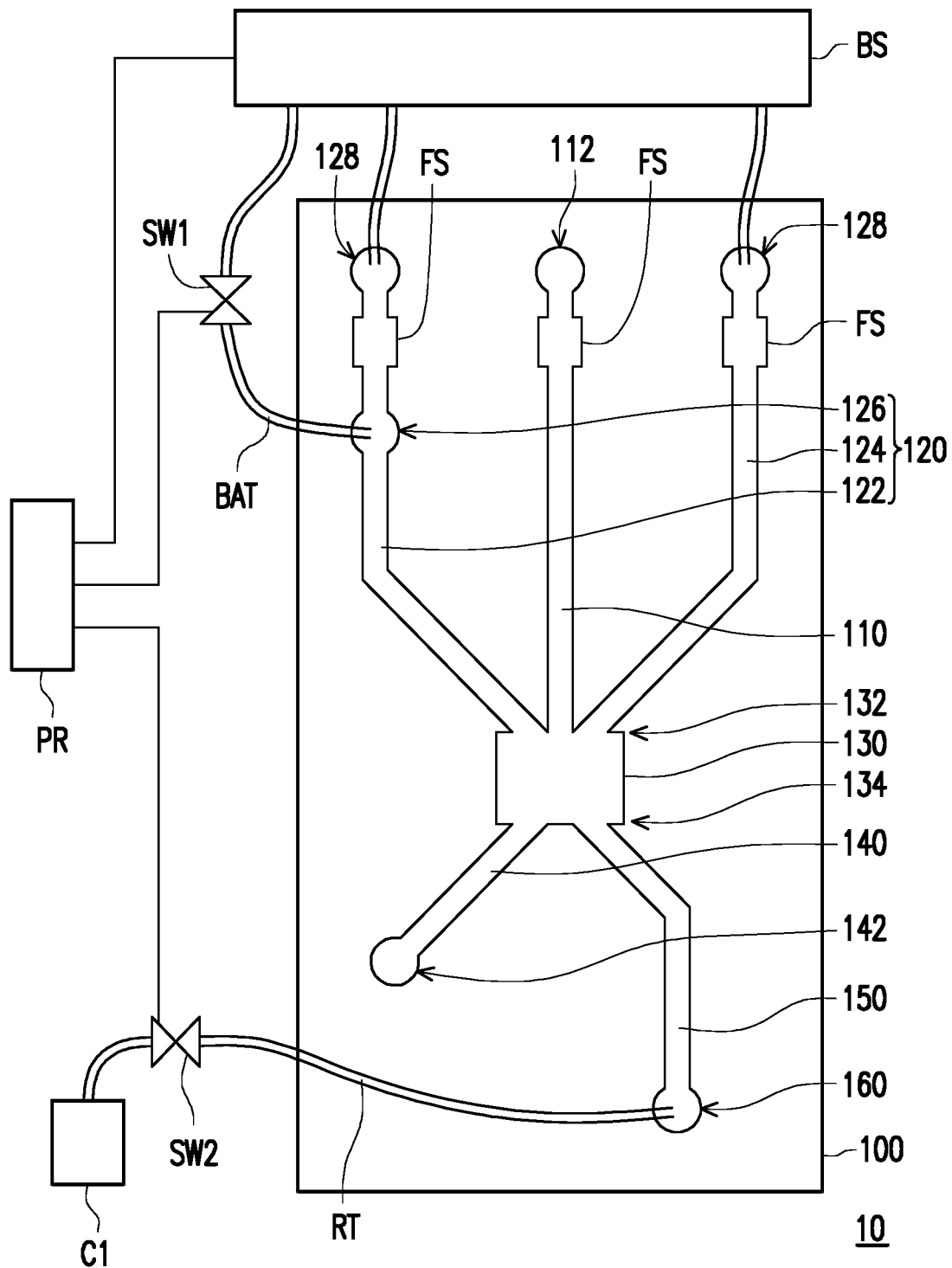
FIG. 1 schematically illustrates an apparatus for collecting and retrieving a fluid sample in accordance with an embodiment of the disclosure.

FIG. 1 schematically illustrates an apparatus for collecting and retrieving a fluid sample in accordance with an embodiment of the disclosure. Referring to FIG. 1, a fluid sample collection and retrieval apparatus 10 includes a microfluidic chip 100, a first switch SW1, a second switch SW2, and a processor PR. The first switch SW1 is connected to the microfluidic chip 100 through a buffer adjustment tube BAT and the second switch SW2 is connected to the microfluidic chip 100 through a retrieval tube RT. In addition, a buffer source BS may be further included in the fluid sample collection and retrieval apparatus 10 for providing a buffer fluid to the microfluidic chip 100 through one or more corresponding tubes. The processor PR is configured to control the first switch SW1 and the second switch SW2 as well as the buffer source BS.

In the embodiment, the buffer adjustment tube BAT establishes a fluid communication between the microfluidic chip 100 and the buffer source BS. The first switch SW1 is attached to the buffer adjustment tube BAT and may adjust the flow rate and/or amount of the buffer fluid entering the microfluidic chip 100 from the buffer source BS. The retrieval tube RT may be connected to the microfluidic chip 100 through the retrieval hole 160 at one terminal while the other terminal of the retrieval tube RT may be connected to a container C1. The second switch SW2 may be detachably connected to the retrieval tube RT. Accordingly, the fluid travelling in the retrieval tube RT may enter the container C1 via detaching the second switch SW2 from the retrieval tube RT.

In the disclosure, the so-called channel in this and the following embodiments may have a width in a range of 5 μm to 5 cm, a length in a range of 5 μm to 5 cm, and a depth in a range of 5 μm to 5 cm, but not limit thereto and the so-called hole in this and the following embodiments may be a hole or opening passing through the outer surface of the microfluidic chip and establishing a fluid communication between a corresponding channel and the external.

In the present embodiment, the microfluidic chip 100 includes a sample channel 110, a fluid directing channel assembly 120, a confluence chamber 130, a waste channel 140, and a collection channel 150. The sample channel 110, the fluid directing channel assembly 120, the waste channel 140 and the collection channel 150 all are in fluid communication with the confluence chamber 130. The sample channel 110 and the fluid directing channel assembly 120 are converged at a first side 132 of the confluence chamber 130 and the collection channel 150 and the waste channel 140 are diverged from a second side 134 of the confluence chamber 130, wherein the first side 132 and the second side 134 are opposite sides.

In the embodiment, the fluid directing channel assembly 120 includes a first buffer channel 122, a second buffer channel 124 and the microfluidic chip 100 further includes a buffer adjustment hole 126 passing through the outer surface of the microfluidic chip 100 and in fluid communication of the first buffer channel 122. The buffer adjustment tube BAT is inserted into the buffer adjustment hole 126 so that the buffer adjustment tube BAT with the first switch SW1 attached thereto is in fluid communication with the first buffer channel 122. The sample channel 110, the first buffer channel 122, and the second buffer channel 124 are converged at the first side 132 of the confluence chamber 130. The sample channel 110, the first buffer channel 122, and the second buffer channel 124 may be coplanar and the first buffer channel 122 and the second buffer channel 124 are arranged at opposite sides of sample channel 110. Accordingly, as shown in FIG. 1, the joint of the sample channel 110 connecting to the confluence chamber 130 may be positioned between the joint of the first buffer channel 122 connecting to the confluence chamber 130 and the joint of the second buffer channel 124 connecting to the confluence chamber 130. Specifically, the joint of the first buffer channel 122 connecting to the confluence chamber 130 may be positioned corresponding to the joint of waste channel 140 connecting to the confluence chamber 130 and the joint of the second buffer channel 124 connecting to the confluence chamber 130 may be positioned corresponding to the joint of the collection channel 150 connecting to the confluence chamber 130.

In addition, the sample channel 110 may be formed with a sample inlet hole 112 at the distal terminal further from the confluence chamber 130, and two buffer inlet holes 128 may be respectively formed at the distal terminal of the first buffer channel 122 further from the confluence chamber 130 and at the distal terminal of the second buffer channel 124 further from the confluence chamber 130, while the buffer adjustment hole 126 may be located between the confluence chamber 130 and the buffer inlet hole 128 of the first buffer channel 122. Each of the sample channel 110, the first buffer channel 122 and the second buffer channel 125 may be further formed with a filter section FS between the inlet holes (the sample inlet hole 112 and the buffer inlet holes 128) and the confluence chamber 130. The filter sections FS may include a plurality of filter slits for filtering unwanted particles or contaminations in the injected sample fluid and buffer fluid.

The waste channel 140 may be formed with a waste outlet hole 142 at the distal terminal further from the confluence chamber 130. The waste outlet hole 142 passes through the outer surface of the microfluidic chip 100 and is in fluid communication with the waste channel 140.

The microfluidic chip 100 may further includes a retrieval hole 160 fondled at the distal terminal of the collection channel 150 further from the confluence chamber 130. The retrieval tube RT is inserted into the retrieval hole 160 to be in fluid communication with the collection channel 150. The waste channel 140 and the collection channel 150 may depart from the confluence chamber 130 at the second side 134. In some embodiments, the fluid may enter the microfluidic chip 100 through the inlet holes (the sample inlet hole 112 and the buffer inlet holes 128) and may be drained away from the microfluidic chip 100 through the waste outlet hole 142 and/or the retrieval hole 160. As such, based on the flow direction of the fluid, the first side 132 of the confluence chamber 130 may be considered as the upstream side while the second side 134 thereof may be considered as the downstream side.

In some embodiments, the fluid sample to be collected and retrieved using the fluid sample collection and retrieval apparatus 10 may be a whole blood sample. The blood sample may be injected to the sample inlet hole 112, travel through the sample channel 110 and enter the confluence chamber 130. During the blood fluid is injected to the sample channel 110, the processor PR may control the buffer source BS to provide buffer fluid to the microfluidic chip 100 through the buffer inlet holes 128 and the buffer adjustment hole 126. Accordingly, the buffer fluid from the buffer source BS may travel through the first buffer channel 122 and the second buffer channel 124 and enter the confluence chamber 130. Namely, the buffer fluid and the sample fluid may merge in the confluence chamber 130.

Before the operation, the blood sample may mix with a known reagent to administrate a fluorescent immunoassays and the fluorescent dyed target cells in the sample fluid can be detected by an optical determination technique. For example, a linear light beam may irradiate on the microfluidic chip 100 in a manner of traversing the sample channel 110. Once a fluorescent dyed cell passes through the linear light beam, the linear light beam may be absorbed or transferred to another wavelength, which allows a detector or a user determining the present of the target sample.

During the operation, the processor PR may control the buffer source BS to provide the desired flow flux (volume flow rate) of the buffer fluid to the microfluidic chip 100. If no target cells are detected, a flow flux of the buffer fluid travelling in the first buffer channel 122 may be about 110 μl/min and a flow flux of the buffer fluid travelling in the second buffer channel 124 may be about 135 μl/min, which allows the sample fluid being directed to enter the waste channel 140 from the confluence chamber 130. As such, the sample fluid may be drained away from the microfluidic chip 100 through the waste outlet hole 142 at the terminal of the waste channel 140.

If a target cell is detected in the sample fluid, the processor PR may control the first switch SW1 to be activated so as to allow more buffer fluid entering the first buffer channel 122 from the buffer source BS. Therefore, the flow flux of the buffer fluid travelling in the first buffer channel 122 may be increased to push the flow of the sample fluid in the confluence chamber 130 to enter the collection channel 150.

For example, under the activation of the first switch SW1, the flow flux of the buffer fluid in the first buffer channel 122 may be 600 μl/min and the flow flux of the buffer fluid in the second buffer channel 124 may be 99 μl/min. Within the duration of operating the flow adjustment of the fluid directing channel assembly 120, the processor PR may further control the second switch SW2 to operate a sample collection in the collection channel 150. The activation of the second switch SW2 allows the fluid in the confluence chamber 130 more efficiently entering the collection channel 150, and the target cell may be retrieved and become a small aliquot staying in the retrieval tube RT.

The activation of the first switch SW1 and the second switch SW2 may be started synchronically or asynchronically by the processor PR. In one embodiment, the processor PR inactivates the first switch SW1 and the second switch SW2 at the same time if no target cells are detected in the sample fluid. In another embodiment, upon determination of the target cells in the fluid sample, the processor PR activates the first switch SW1 and the second switch SW2 at the same time, or may activates the first switch SW1 and the second switch SW2 at different time points. Accordingly, the duration of the activation of the first switch SW1 and the duration of the activation of the second switch SW2 may overlap partially or entirely. In a preferred embodiment, the activation of the first switch SW1 is later than the second switch SW2. The delay time of activating the first switch SW1 may depend on the position where the determination of the target sample is performed, the travelling length of the sample fluid from said determination position to the joint between the confluence chamber 130 and the collection channel 150, and the flow velocity of the sample fluid. In addition, the duration of activating the first switch SW1 may be controlled by the processor PR so that the amount of the unwanted portion of the sample fluid entering the collection channel 150 may be limited. For example, each operation of the activation of the first switch SW1 and the activation of the second switch SW2 may last for 1 ms (milliseconds) to 5 seconds.

When the operation ends, the retrieved target cells in the retrieval tube RT can be further collected to the container C1. In some embodiments, the second switch SW2 may be detached from the retrieval tube RT, the buffer fluid from the buffer source BS may be continuously supplied to the first buffer channel 122 and the second buffer channel 124; therefore, the retrieved sample fluid will be flushed out from the retrieval tube RT to the container C1. In some embodiments, the container C1 may be a vial or an eppendorf and the collected sample in the container C1 may be used for further experiments or analysis directly.

Figure 2:
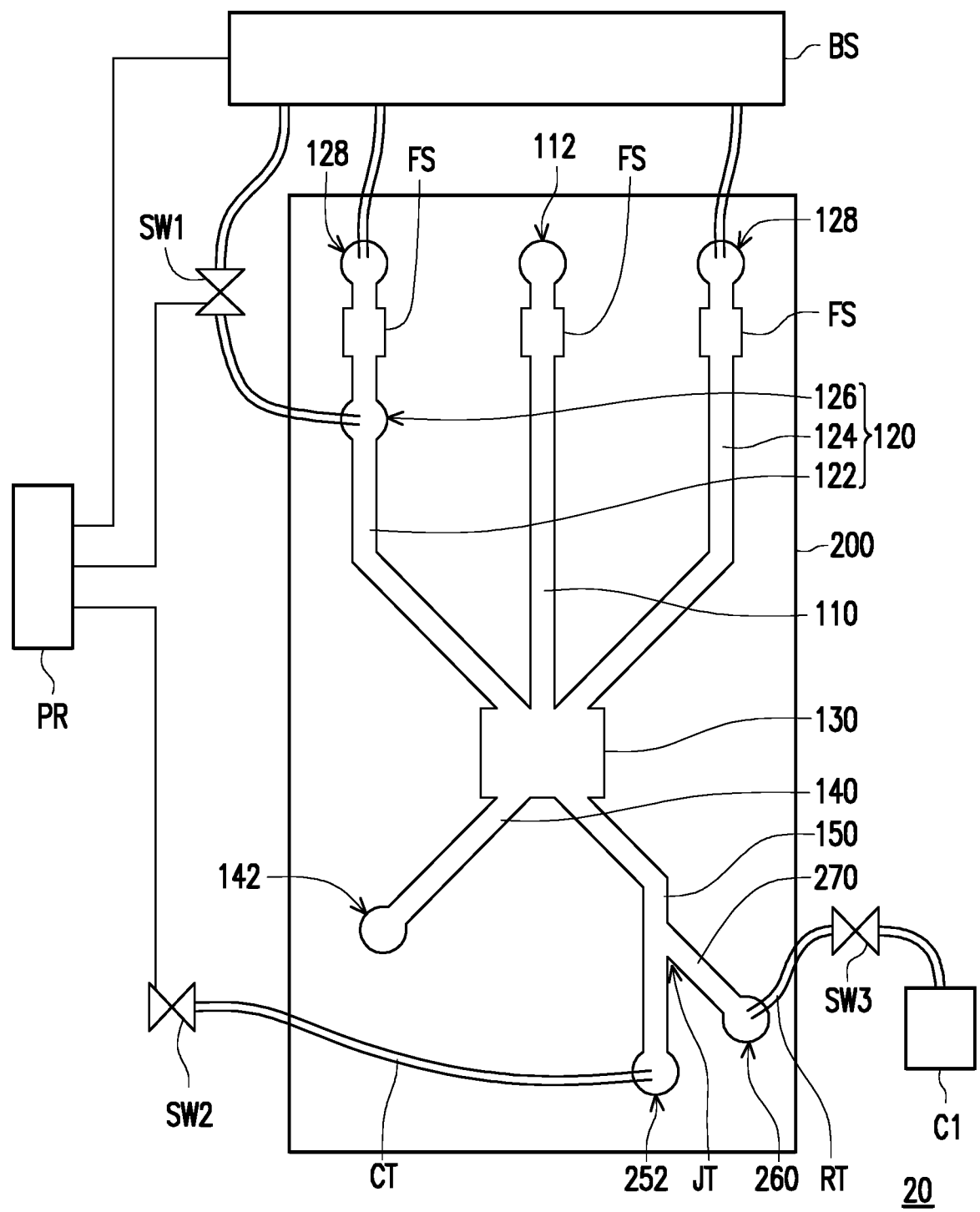
FIG. 2 schematically illustrates an apparatus for collecting and retrieving a fluid sample in accordance with another embodiment of the disclosure.

FIG. 2 schematically illustrates an apparatus for collecting and retrieving a fluid sample in accordance with another embodiment of the disclosure. Referring to FIG. 2, a fluid sample collection and retrieval apparatus 20 includes a microfluidic chip 200, a first switch SW1, a second switch SW2, a third switch SW3 and a processor PR. Specifically, the first switch SW1 may be connected to the microfluidic chip 200 through a buffer adjustment tube BAT, the second switch SW2 may be connected to the microfluidic chip 200 through a control tube CT and the third switch SW3 may be connected to the microfluidic chip 200 through a retrieval tube RT. In addition, a buffer source BS may be further included in the fluid sample collection and retrieval apparatus 20 for providing buffer fluid to the microfluidic chip 200 through one or more corresponding tubes. In the present embodiment, the functions and the dispositions of the first switch SW1 and the second switch SW2, and a portion of the channel layout of the microfluidic chip 200 may be similar to the microfluidic chip 100.

In the present embodiment, the microfluidic chip 200 includes a sample channel 110, a fluid directing channel assembly 120 including a first buffer channel 122 and a second buffer channel 124, a confluence chamber 130, a waste channel 140, a collection channel 150, and a retrieval channel 270. The connection relationship and channel layout of the sample channel 110, the fluid directing channel assembly 120, the confluence chamber 130, the waste channel 140, and the collection channel 150 may be similar to those described in FIG. 1 and not reiterated here. The microfluidic chip 200 may, but not limit to, be different from the microfluidic chip 100 in that the retrieval channel 270 branching from the collection channel 150 at the joint JT is further included, the retrieval hole 260 is formed at the distal terminal of the retrieval channel 270 further from the collection channel 150, and a control hole 252 is configured at the distal terminal of the collection channel 150 further away from the confluence chamber 130. In the present embodiment, the retrieval tube RT is inserted to the retrieval hole 260 to be in fluid communication with the retrieval channel 270 and the third switch SW3 is attached to the retrieval tube RT. In addition, the control tube CT is inserted to the control hole 252 with the second switch SW2 attached thereto.

In the present embodiment, the processor PR may be configured to control the first switch SW1, the second switch SW2 and the buffer source BS and may, but not limit to, be also configured to control the third switch SW3 to operate a sample retrieval. In some alternative embodiments, the third switch SW3 may be controlled manually. The operation of the fluid sample collection and retrieval apparatus 20 may be partially the same as that of the fluid sample collection and retrieval apparatus 10. For example, a sample fluid may be injected to the microfluidic chip 20 via the sample inlet hole 112 and simultaneously, the buffer fluid from the buffer source BS may be injected to the first buffer channel 122 and the second buffer channel 124 via the buffer inlet holes 128. Therefore, the sample fluid travelling in the sample channel 110, the buffer fluid travelling in the first buffer channel 122 and the buffer fluid travelling in the second buffer channel 124 may merge in the confluence chamber 130 and the flow direction of the sample fluid in the confluence chamber 130 may be directed by the buffer fluid from the first buffer channel 122 and the second buffer channel 124.

The determination of the target sample described in above for depicting the operation of the fluid sample collection and retrieval apparatus 10 may be applied to the present embodiment and not reiterated here. In the case that no target sample is detected, the processor PR may control the buffer source BS to provide desirable flow flux of the buffer fluid to the first buffer channel 122 and the second buffer channel 124, so that the flow of the sample fluid in the confluence chamber 130 may be directed to enter the waste channel 140. Upon the detection of the target sample in the sample fluid travelling in the sample channel 110, the processor PR may further activate the first switch SW1 to adjust the flow rate of the buffer fluid of the first buffer channel 122; therefore, the sample fluid in the confluence chamber 130 shall enter the collection channel 150. As such, the sample fluid entering the collection channel 150 from the confluence chamber 130 is the sorted sample fluid containing the target sample therein.

During the activation of the first switch SW1, the processor PR may also active the second switch SW2. The sequence and the time period of activating the first switch SW1 and the second switch SW2 may refer to the above description for depicting the operation of the embodiment of FIG. 1. The activation of the second switch SW2 may allow the fluid in the collection channel 150 travelling towards the control tube CT so that the sorted sample fluid in the confluence chamber 130 may more efficiently enter the collection channel 150.

Subsequently, the third switch SW3 may be activated to operate a sample retrieval after the first switch SW1 and the second switch SW2 are stopped, such that the sorted sample fluid in the collection channel 150 is able to enter the retrieval channel 270 from the collection channel 150, pass through the retrieval channel 270 and the retrieval tube RT, and further enter the container C1. In some embodiments, the first switch SW1, the second switch SW2, and the third switch SW3 may be activated and inactivated by the processor PR simultaneously. In some embodiments, the first switch SW1 may be activated in the first place, and the second switch SW2 and the third switch SW3 are activated at the same time after the first switch SW1 is inactivated. In some embodiments, the first switch SW1 and the second switch SW2 are activated at the same time, and the third switch SW3 is activated subsequently. In still another embodiment, the second switch SW2 is activated in the first place, and the third switch SW3 and the first switch SW1 are activated later subsequently. As described herein, the skilled person in the art shall know how to choose the activation sequence and opening time of the switches according to the characteristics of the target samples. In one particular example, the activation time of each switch may last for 1 ms (milliseconds) to 5 seconds.

Figure 3:
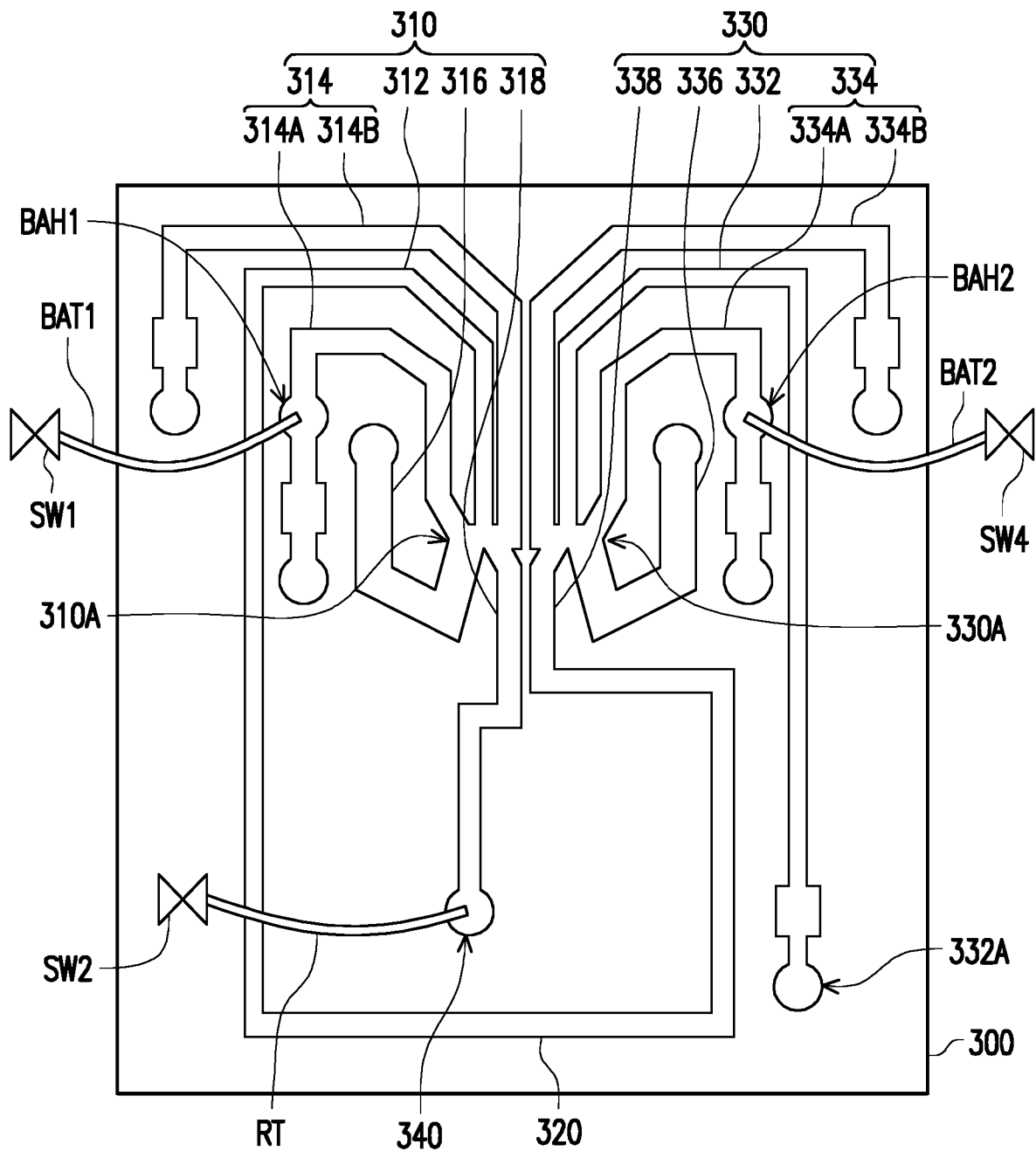
FIG. 3 schematically illustrates a microfluidic chip in accordance with an embodiment of the disclosure.

FIG. 3 schematically illustrates a microfluidic chip 300, which is another embodiment of the microfluidic chip 100 as described in FIG. 1. Referring to FIG. 3, a microfluidic chip 300 may include a first sorting channel system 310, a connection channel 320 and a second sorting channel system 330. The first sorting channel system 310 includes a first sample channel 312, a first fluid directing channel assembly 314, a first waste channel 316 and a first collection channel 318, wherein the first fluid directing channel assembly 314 may include a first buffer channel 314A and a second buffer channel 314B positioned at two opposite sides of the first sample channel 312. The first sorting channel system 310 may further include a first confluence chamber 310A. In addition, a buffer adjustment hole BAH1 may further be formed in the first buffer channel 314A, and a retrieval hole 340 may be formed at the distal terminal of the first collection channel 318 further from the first confluence chamber 310A. A buffer adjustment tube BAT1 is inserted into the buffer adjustment hole BAH1 and a retrieval tube RT is inserted into the retrieval hole 340. The first switch SW1 and the second switch SW2 are attached to the buffer adjustment tube BAT1 and the retrieval tube RT, respectively. The connection relationship and mechanism of the operation of the first sorting channel system 310 is similar to microfluidic chip 100 described in FIG. 1 and not reiterated herein.

The second sorting channel system 330 includes a second sample channel 332, a second fluid directing channel assembly 334, a second waste channel 336 and a second collection channel 338, wherein the second fluid directing channel assembly 334 may include a first buffer channel 334A and a second buffer channel 334B positioned at two opposite sides of the second sample channel 332. In addition, the connection channel 320 is connected and establishes a fluid communication between the second collection channel 338 and the first sample channel 312.

Similarly, the second sorting channel system 330 may further include a second confluence chamber 330A. The second sample channel 332, the first buffer channel 334A and the second buffer channel 334B may be converged at a first side of the second confluence chamber 330A and the second waste channel 336 and the second collection channel 338 may be diverged from a second side of the second confluence chamber 330A, while the first side and the second side are two opposite sides of the second confluence chamber 330A. In addition, the first buffer channel 334A comprises a buffer adjustment hole BAH2, and another buffer adjustment tube BAT2 is inserted into the buffer adjustment hole BAH2, while another switch, such as the fourth switch SW4 is attached to the buffer adjustment tube BAT2.

In some embodiments, the sample fluid is injected to the microfluidic chip 300 through a sample inlet hole 332A at the distal terminal of the second sample channel 332 further away from the second confluence chamber 330A. Accompanying with the injection of the sample fluid, a buffer source (not shown) may also supply buffer fluid to the first buffer channel 334A and the second buffer channel 334B. As such, the sample fluid travelling through the second sample channel 332, the buffer fluid travelling through the first buffer channel 334A and the second buffer channel 334B may converge in the second confluence chamber 330A. The sample fluid will be directed to either the second sample channel or the waste channel 360 depending on the flow condition difference of the buffer fluids in the first buffer channel 334A and the second buffer channel 334B.

As described herein, the microfluidic chip 300 further comprises an additional sorting channel system, the second sorting system 330. Because the target cells in the sample fluid are collected and enriched in the second sorting channel system 330 in advance, the retrieval purity of the target cells/target samples in the first sorting channel system 310 would be significantly increased in comparison with the microfluidic chip 100. Methods of detecting the target samples in the sample fluid travelling in the microfluidic chip are known in the art. Upon the detection of the target sample, the processor (not shown) may activate the fourth switch SW4 to increase the flow flux of the buffer fluid travelling in the first buffer channel 334A. Under the increased flow flux of the buffer fluid in the first buffer channel 334A, the flow of the sample fluid containing the target sample may be directed to enter the second collection channel 338. The sorted sample fluid containing the target sample may further travel through the connection channel 320 and enter the first sample channel 312 of the first sorting channel system 310.

Figure 4:
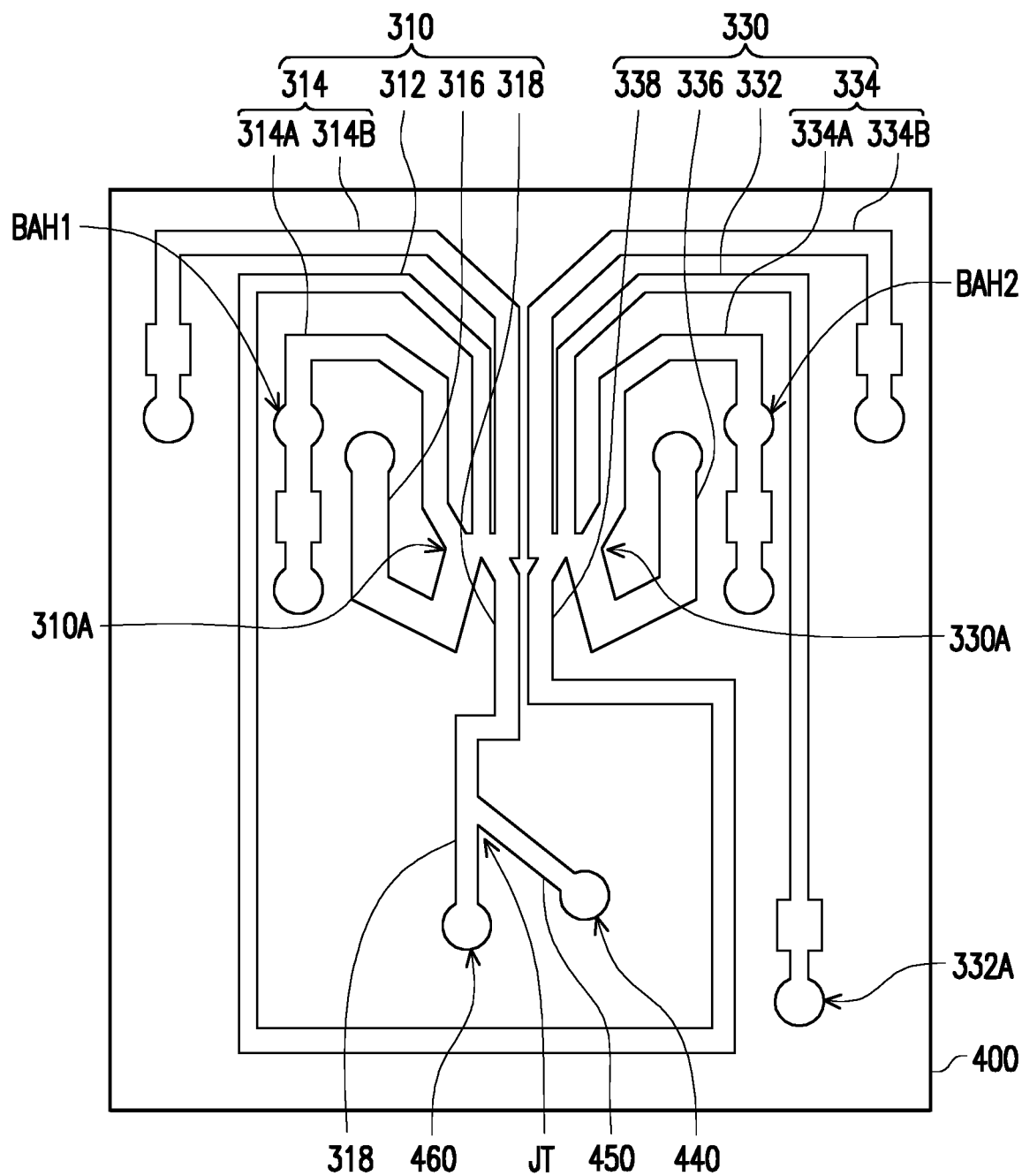
FIG. 4 schematically illustrates a microfluidic chip in accordance with another embodiment of the disclosure.

FIG. 4 schematically illustrates a microfluidic chip 400, which is another embodiment of the microfluidic chip 200 as described in FIG. 2. Referring to FIG. 4, a microfluidic chip 400 is similar to the microfluidic chip 300, and the similar or the same components described in the two embodiments may be denoted by the same reference numbers. Specifically, the microfluidic chip 400 further includes the retrieval channel 440 branched from the first collection channel 318. The hole formed at the distal terminal of the first collection channel 318 is served as a control hole 460 and the hole formed at the distal terminal of the retrieval channel 450 is served as a retrieval hole 440. The joint of the retrieval channel 450 connected to the first collection channel 318 is positioned between the first confluence chamber 310A and the control hole 460. In addition, the functions and the operations of the first sorting channel system 310, the retrieval channel 450, the control hole 460 and the retrieval hole 440 may refer to the descriptions of the embodiment of FIG. 2.

In the embodiments of FIG. 3 and FIG. 4, the connection channel 320 connected between the first sorting channel system 310 and the second sorting channel system 330 may be designed to generate a single cell suspension. By increasing the distance between the cells, the target cell may be separated further from the non-target cells, and thus the determination of target sample for the sample fluid entering the first sorting channel system 310 from the connection channel 320 may have higher accuracy. According to the present invention, the connection channel 320 may be designed to have a plurality of longitudinal-particle-separation sections, which is serially connected along an extending direction of the connection channel 320. Each of the longitudinal-particle-separation sections comprises at least one winding portion and at least one shortcut portion, wherein the winding portion and the shortcut portion are connected in parallel between two joints at opposite terminals of the each of the longitudinal-particle-separation sections, and the path length of the winding portion is greater than the path length of the shortcut portion. FIGS. 5A-5D are some exemplary examples for the connection channels having the longitudinal-particle-separation sections, but the disclosure is not limited thereto.

Figure 5A:
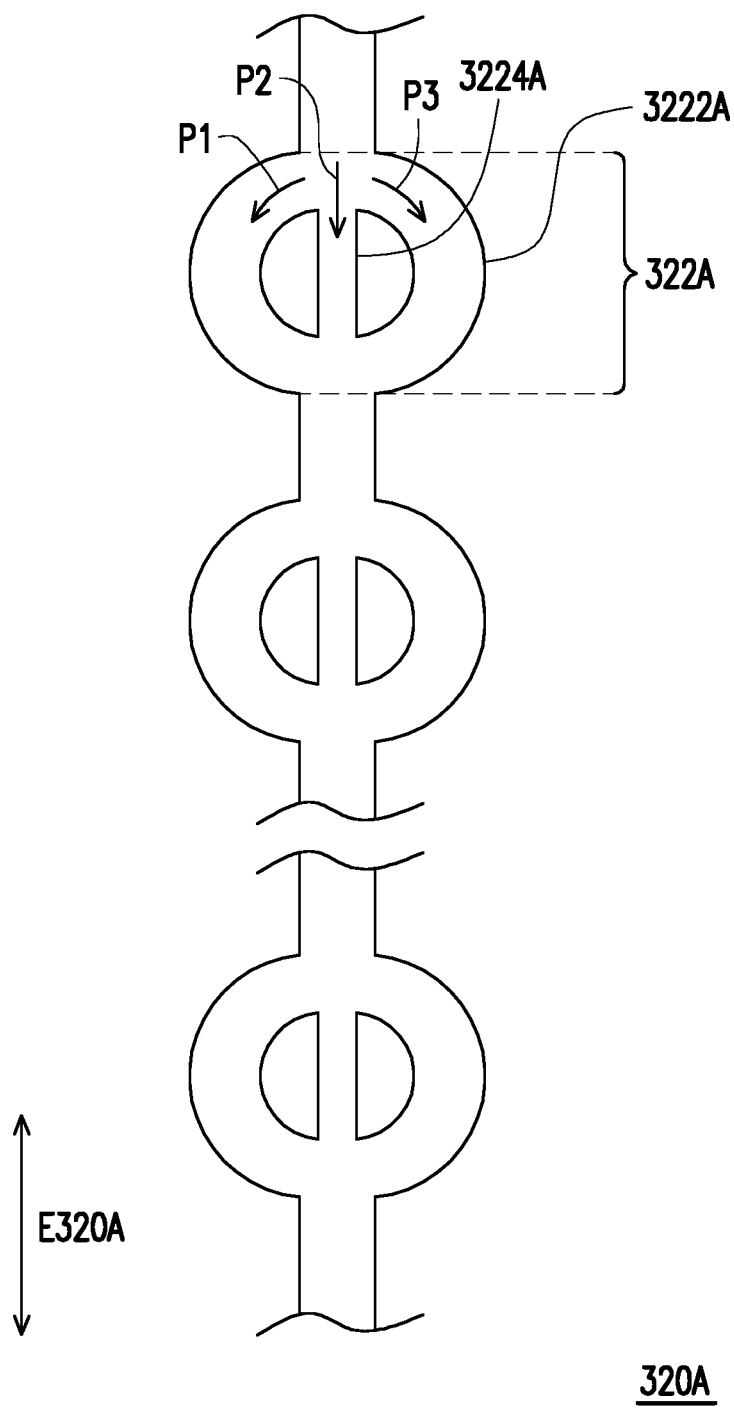
FIG. 5A-5D schematically illustrates respective connection channels in accordance with several embodiments of the disclosure.

FIG. 5A schematically illustrates a connection channel in accordance with an embodiment. In FIG. 5A, a connection channel 320A includes a plurality of longitudinal-particle-separation sections 322A serially connected along the extending direction E320A of the connection channel 320A. Each of the longitudinal-particle-separation sections 322A includes two winding portions 3222A and a shortcut portion 3224A positioned between the two winding portions 3222A. The winding portions 3222A and the shortcut portion 3224A are connected in parallel between two joints at opposite terminals of one longitudinal-particle-separation section 322A, in which the two joints are not specifically marked in FIG. 5A, but corresponding to the positions of the dashed lines. For example, the two terminal ends of each of the winding portions 3222A and the shortcut portion 3224A are accordantly jointed together to form the two joints, and the winding portions 3222A and the shortcut portion 3224A are longitudinally arranged in parallel. As such, the longitudinal-particle-separation section 322A may define three flow paths P1, P2 and P3 and the three flow paths P1, P2 and P3 are individual flow paths and are only in fluid communication with one another at the two joints. As shown in FIG. 5A, the flow path P1 is defined by one of the winding portions 3222A, the flow path P2 is defined by the shortcut portion 3224A, and the flow path P3 is defined by the other winding portion 3222A. In the present embodiment, each of the winding portions 3222A is an arc shaped portion while the shortcut portion 3224A is a straight linear portion. Therefore, a path length of each winding portion 3222A, such as the length of the flow path P1 or P3 is larger than a path length of the shortcut portion 3224A, such as the length of the flow path P2. The sample fluid travelling along the flow paths P1, P2, and P3 may move in various velocities, so as to separate the particles in the sample fluid further away from one another.

Figure 5B:
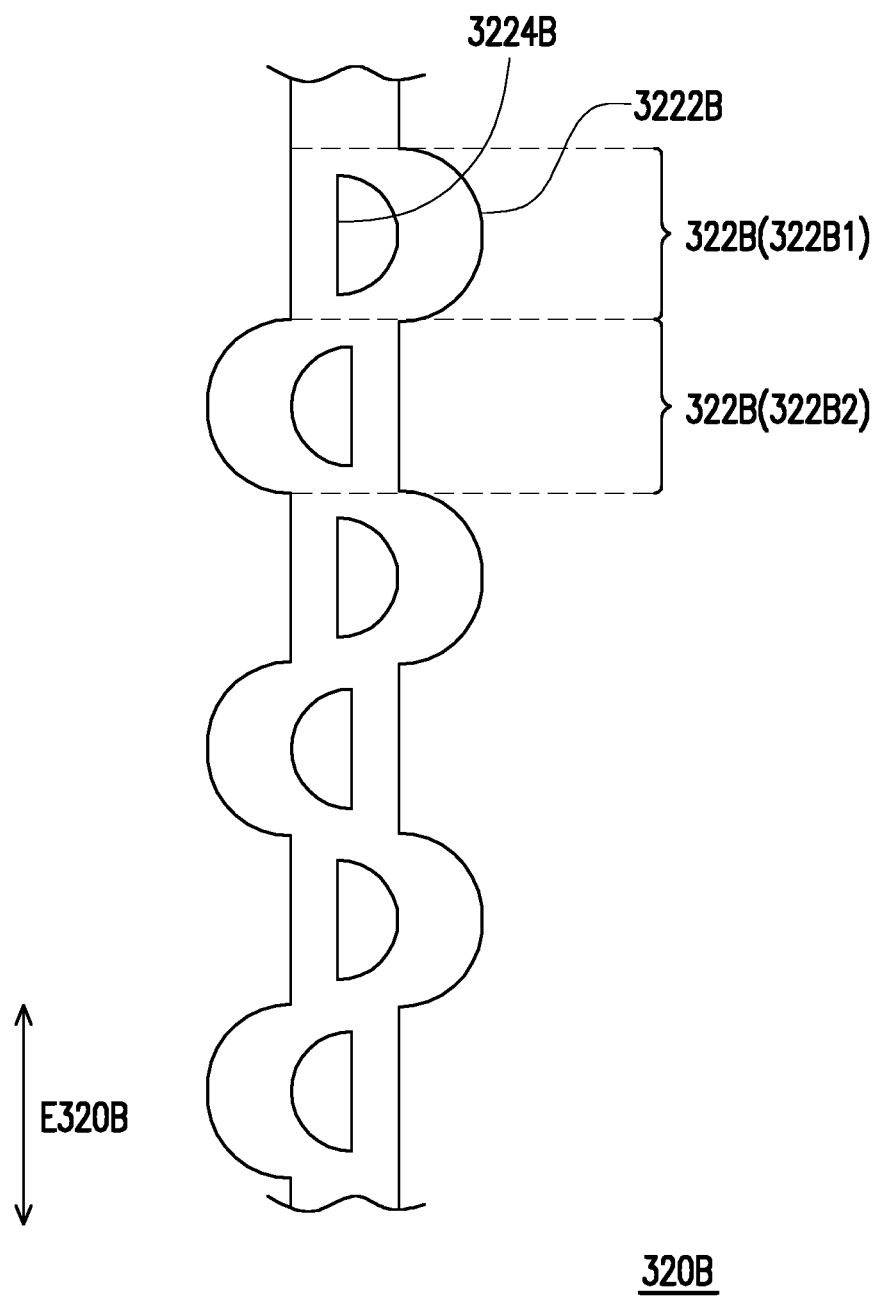

FIG. 5B schematically illustrates a connection channel in accordance with still another embodiment. In FIG. 5B, a connection channel 320B may include a plurality of longitudinal-particle-separation sections 322B serially connected along the extending direction E320B of the connection channel 320B. The winding portion 3222B and the shortcut portion 3224B are connected in parallel between two joints at opposite terminals of one longitudinal-particle-separation section 322B, in which the two joints are not specifically marked in FIG. 5B, but corresponding to the positions of the dashed lines. In the embodiment, each of the longitudinal-particle-separation sections 322B includes a winding portion 3222B and a shortcut portion 3224B beside the winding portion 3222B. Specifically, the winding portion 3222B may have an arc-like shape and the shortcut portion 3224B may have a straight linear shape, so that a path length of a winding portion 3222B is larger than a path length of the shortcut portion 3224B. In addition, the arrangement relationship of the winding portion 3222B and the shortcut portion 3224B in two neighbor longitudinal-particle-separation sections 322B may be different. For example, a shortcut portion 3224B of one longitudinal-particle-separation section 322B1 may be connected to a winding portion 3222B of a next longitudinal-particle-separation section 322B2 in the extending direction E320B of the connection channel 320B. As such, the sample fluid travelling in the winding portion 3222B of one longitudinal-particle-separation section 322B enters the shortcut portion 3224B of the next longitudinal-particle-separation section 322B and vice versa. In addition, some of the sample fluid travelling in the winding portion 3222B of one longitudinal-particle-separation section 322B may obliquely move to enter the winding portion 3222B of the next longitudinal-particle-separation section 322B, which further extends the travelling path of the particles. Accordingly, the particles in the sample fluid travelling in the longitudinal-particle-separation sections 322B may move in various velocities to separate further away from one another.

Figure 5C:
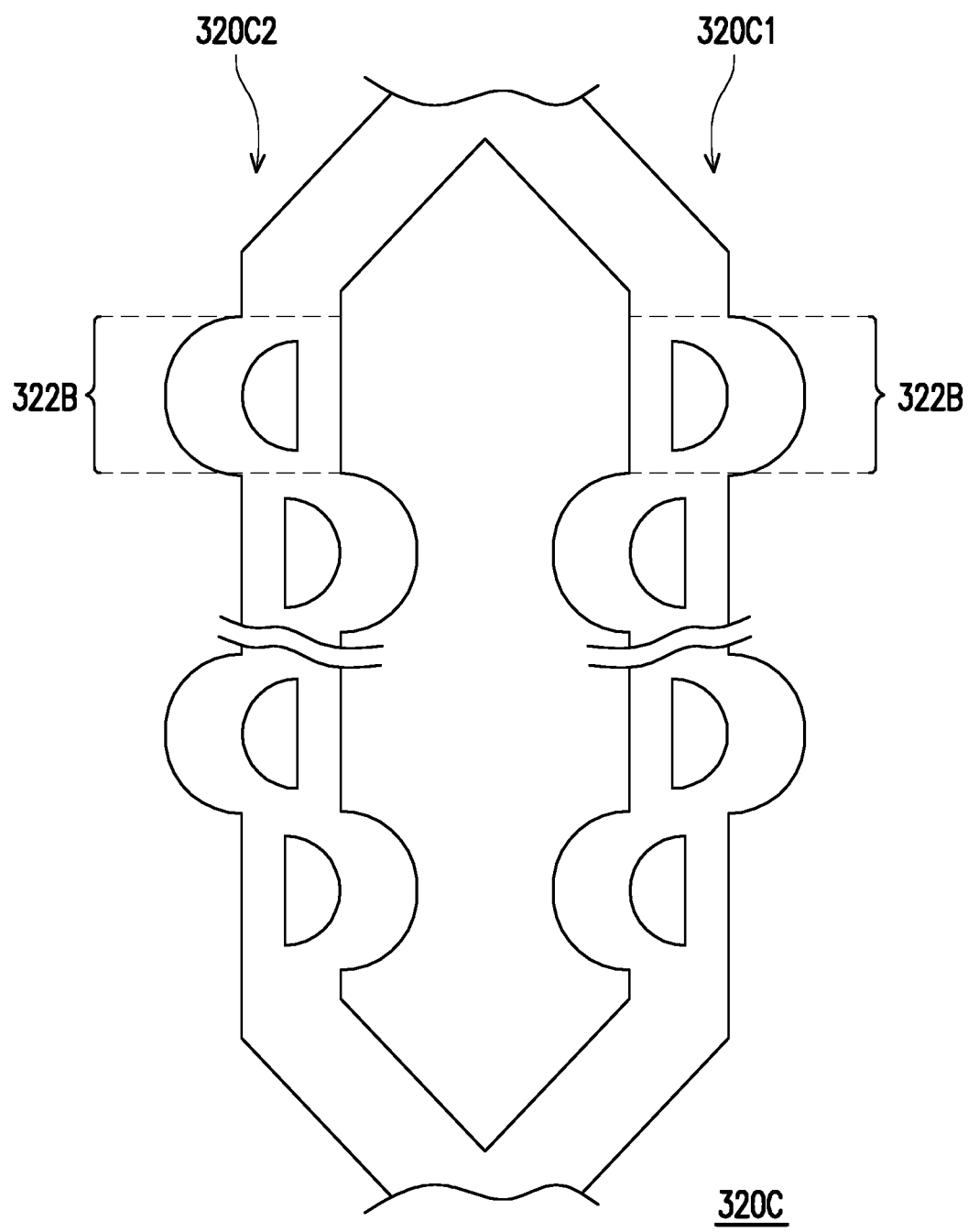

FIG. 5C schematically illustrates the connection channel in accordance with a further embodiment of the disclosure. As shown in FIG. 5C, a connection channel 320C may include a first bifurcation 320C1 and a second bifurcation 320C2. The first bifurcation 320C1 and the second bifurcation 320C2 are connected in parallel. In other words, at a terminal of the connection channel 320C, the first bifurcation 320C1 and the second bifurcation 320C2 are jointed and at the other terminal of the connection channel 320C, the first bifurcation 320C1 and the second bifurcation 320C2 are also jointed, while between the two opposite terminals of the connection channel 320C, the first bifurcation 320C1 and the second bifurcation 320C2 independently define respective flow channels. The first bifurcation 320C1 may have a channel layout similar to or mirror to the second bifurcation 320C2. Specifically, each of the first bifurcation 320C1 and the second bifurcation 320C2 may have a channel design substantially the same as the connection channel 320B shown in FIG. 5B. Namely, each of the first bifurcation 320C1 and the second bifurcation 320C2 includes a plurality of longitudinal-particle-separation sections 322B and the details with respect to the layout of the longitudinal-particle-separation sections 322B may refer to the above descriptions and not iterated here. By configuring the longitudinal-particle-separation sections 322B in each of the first bifurcation 320C1 and the second bifurcation 320C2, distance between the particles in the sample fluid travelling through the connection channel 320C may be elongated.

Figure 5D:
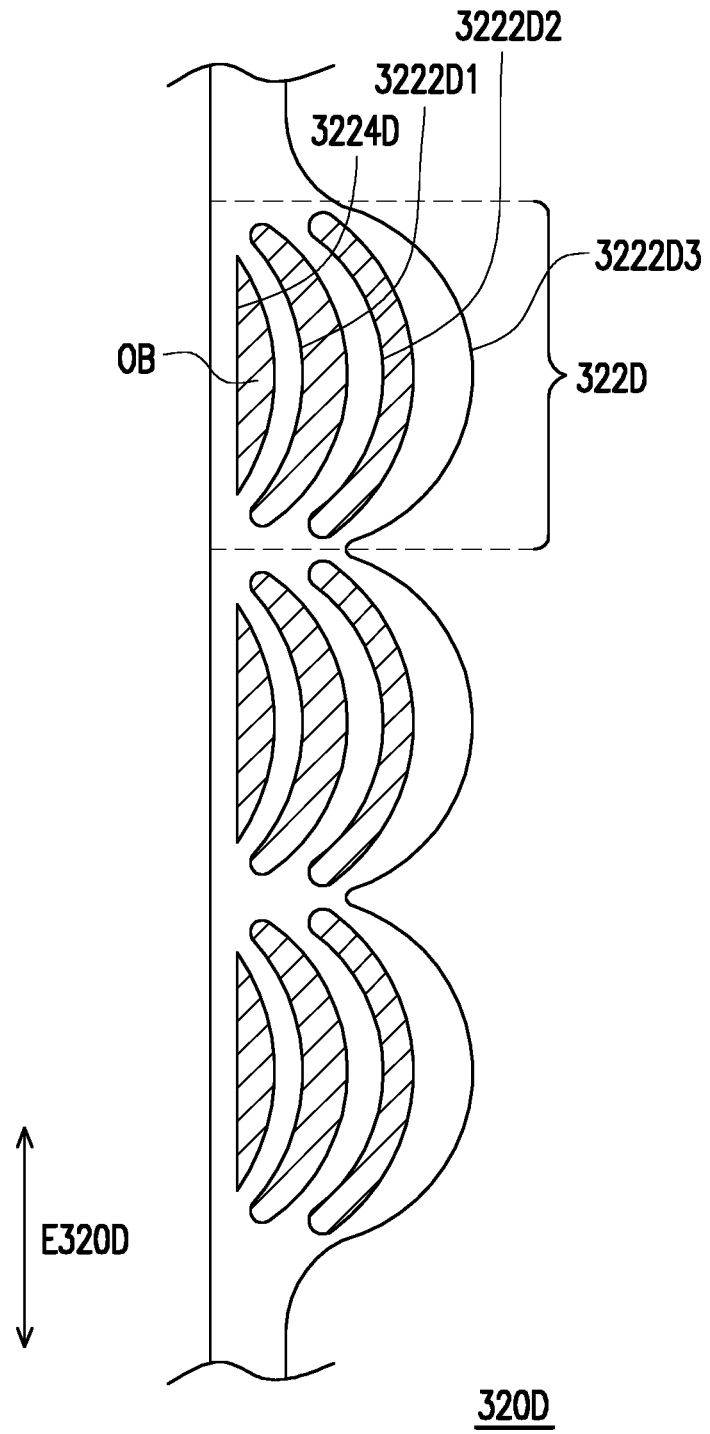

FIG. 5D schematically illustrates a connection channel in accordance with again another embodiment of the disclosure. A connection channel 320D shown in FIG. 5D may include a plurality of longitudinal-particle-separation sections 322D serially connected along the extending direction E320D of the connection channel 320D. Specifically, a plurality of obstacles OB may be arranged in each of the longitudinal-particle-separation sections 322D so that the longitudinal-particle-separation section 322D may include a plurality of winding portions 3222D1, 3222D2 and 3222D3 and a shortcut portion 3224D. The winding portions 3222D1-3222D3 and the shortcut portion 3224D are connected in parallel between two joints at opposite terminals of one longitudinal-particle-separation section 322D, in which the two joints are not specifically marked in FIG. 5D, but corresponding to the positions of the dashed lines. In the present embodiment, a path length of the shortcut portion 3224D is less than a path length of the winding portions 3222D1, the path length of the winding portions 3222D1 is less than a path length of the winding portions 3222D2, the path length of the winding portions 3222D2 is less than a path length of the winding portions 3222D3. After travelling in the connection channel 320D having the longitudinal-particle-separation sections 322D for a while, the particles in the sample fluid may be separated by a longer distance compared to before travelling the connection channel 320D.

In view of the above, the fluid sample collection and retrieval apparatus according to some embodiments may be used for retrieving the sorted sample in the sample fluid from a microfluidic chip. Accordingly, the retrieved sample may be used for treating, testing, or other operating on an external device or apparatus. The fluid sample collection and retrieval apparatus according to some embodiments may retrieve the sorted sample in the sample fluid from the microfluidic chip through an exclusively retrieval channel without though the channels designed for sorting, so that the switch for sorting may not be blocked or contaminated by the to-be retrieved sample fluid, which ensures the lifetime of the apparatus. In addition, according to some embodiments, the microfluidic chip includes two sorting channel systems, which allows the sample fluid being sorted twice in the chip so as to enhance the accuracy of the target sample sorting. In some further embodiments, the connection channel connected between two sorting channel systems may further help to elongate the distance between the particles in the sample fluid travelling therethrough, so that the accuracy of the determination of target sample may be further enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fluid sample collection and retrieval apparatus, comprising:
    a microfluidic chip, comprising:
        a first sample channel;
        a first fluid directing channel assembly;
        a first confluence chamber, wherein the first sample channel and the first fluid directing channel assembly are converged at a first side of the first confluence chamber;
        a first collection channel;
        a first waste channel, the first collection channel and the first waste channel diverged from a second side of the first confluence chamber, wherein the first side and the second side are opposite sides; and
        a retrieval hole, passing through an outer surface of the microfluidic chip, wherein the first collection channel forms a fluid communication between the retrieval hole and the first confluence chamber;
    a retrieval tube connected to the retrieval hole;
    a first switch connected to the microfluidic chip and configured to operate a flow adjustment of the first fluid directing channel assembly;
    a second switch attached to the retrieval tube; and
    a processor configured to activate the first switch to operate the flow adjustment of the first fluid directing channel assembly and activate the second switch to operate a sample collection in the first collection channel within a duration of operating the flow adjustment of the first fluid directing channel assembly,
    wherein the first fluid directing channel assembly comprises a first buffer channel, a second buffer channel and a buffer adjustment hole passing through the outer surface of the microfluidic chip and in fluid communication of the first buffer channel, and
    the first sample channel, the first buffer channel and the second buffer channel are converged at the first side of the first confluence chamber.

2. The fluid sample collection and retrieval apparatus of claim 1, wherein the second switch is detachably attached to the retrieval tube.

3. The fluid sample collection and retrieval apparatus of claim 1, wherein
    a joint of the first sample channel connecting to the first confluence chamber is positioned between a joint of the first buffer channel connecting to the first confluence chamber and a joint of the second buffer channel connecting to the first confluence chamber.

4. The fluid sample collection and retrieval apparatus of claim 3, further comprising a buffer adjustment tube connecting to the buffer adjustment hole, and the first switch is attached to the buffer adjustment tube.

5. The fluid sample collection and retrieval apparatus of claim 1, wherein the microfluidic chip further comprises:
    a second sample channel;
    a second fluid directing channel assembly;
    a second confluence chamber, wherein the second sample channel and the second fluid directing channel assembly are converged at a first side of the second confluence chamber;
    a second collection channel;
    a second waste channel, the second collection channel and the second waste channel diverged from a second side of the second confluence chamber, wherein the second side of the second confluence chamber is opposite to the first side of the second confluence chamber; and
    a connection channel, forming a fluid communication between the first sample channel and the second collection channel.

6. The fluid sample collection and retrieval apparatus of claim 5, wherein
    the second fluid directing channel assembly comprises a first buffer channel, a second buffer channel and a buffer adjustment hole passing through the outer surface of the microfluidic chip and in fluid communication of the first buffer channel,
    the second sample channel, the first buffer channel and the second buffer channel are converged at the first side of the second confluence chamber, and
    a joint of the second sample channel connecting to the second confluence chamber is positioned between a joint of the first buffer channel connecting to the second confluence chamber and a joint of the second buffer channel connecting to the second confluence chamber.

7. The fluid sample collection and retrieval apparatus of claim 6, further comprising a buffer adjustment tube connecting to the buffer adjustment hole, and a third switch attached to the buffer adjustment tube.

8. The fluid sample collection and retrieval apparatus of claim 7, wherein the processor is further configured to activate the third switch independently from activating the first switch and the second switch.

9. The fluid sample collection and retrieval apparatus of claim 5, wherein the connection channel comprises a plurality of longitudinal-particle-separation sections serially connected along an extending direction of the connection channel, each of the longitudinal-particle-separation sections comprises at least one winding portion and at least one shortcut portion, wherein the winding portion and the shortcut portion are connected in parallel between two joints at opposite terminals of the each of the longitudinal-particle-separation sections, and a path length of the winding portion is greater than a path length of the shortcut portion.

10. A fluid sample collection and retrieval apparatus, comprising:
    a microfluidic chip, comprising:
        a first sample channel;
        a first fluid directing channel assembly;
        a first confluence chamber, wherein the first sample channel and the first fluid directing channel assembly are converged at a first side of the first confluence chamber;
        a first collection channel;
        a first waste channel, the first collection channel and the first waste channel diverged from a second side of the first confluence chamber, wherein the first side and the second side are opposite sides;
        a control hole passing through an outer surface of the microfluidic chip, wherein the first collection channel forms a fluid communication between the control hole and the first confluence chamber;
        a retrieval channel branched from the first collection channel at a joint between the control hole and the first confluence chamber; and
        a retrieval hole passing through the outer surface of the microfluidic chip, wherein the retrieval channel forms a fluid communication between the retrieval hole and the first collection channel;
    a retrieval tube connected to the retrieval hole;
    a control tube connected to the control hole;
    a first switch connected to the microfluidic chip and configured to operate a flow adjustment of the first fluid directing channel assembly;
    a second switch attached to the control tube;
    a third switch attached to the retrieval tube; and
    a processor configured to activate the first switch to operate the flow adjustment of the first fluid directing channel assembly, activate the second switch to operate a sample collection in the first collection channel within a duration of operating the flow adjustment of the first fluid directing channel assembly, and activate the third switch to operate a sample retrieval after operating the sample collection in the first collection channel,
    wherein the first fluid directing channel assembly comprises a first buffer channel, a second buffer channel and a buffer adjustment hole passing through the outer surface of the microfluidic chip and in fluid communication of the first buffer channel, and
    the first sample channel, the first buffer channel and the second buffer channel are converged at the first side of the first confluence chamber.

11. The fluid sample collection and retrieval apparatus of claim 10, wherein the processor is further configured to stop activating the second switch during activating the third switch.

12. The fluid sample collection and retrieval apparatus of claim 10, wherein
    a joint of the first sample channel connecting to the first confluence chamber is positioned between a joint of the first buffer channel connecting to the first confluence chamber and a joint of the second buffer channel connecting to the first confluence chamber.

13. The fluid sample collection and retrieval apparatus of claim 12, further comprising a buffer adjustment tube connecting to the buffer adjustment hole, and the first switch is attached to the buffer adjustment tube.

14. The fluid sample collection and retrieval apparatus of claim 10, wherein the microfluidic chip further comprises:
    a second sample channel;
    a second fluid directing channel assembly;
    a second confluence chamber, wherein the second sample channel and the second fluid directing channel assembly are converged at a first side of the second confluence chamber;
    a second collection channel;
    a second waste channel, the second collection channel and the second waste channel diverged from a second side of the second confluence chamber, wherein the first side of the second confluence chamber is opposite to the second side of the second confluence chamber; and
    a connection channel, forming a fluid communication between the first sample channel and the second collection channel.

15. The fluid sample collection and retrieval apparatus of claim 14, wherein
    the second fluid directing channel assembly comprises a first buffer channel, a second buffer channel and a buffer adjustment hole passing through the outer surface of the microfluidic chip and in fluid communication of the first buffer channel,
    the second sample channel, the first buffer channel and the second buffer channel are converged at the first side of the second confluence chamber, and
    a joint of the second sample channel connecting to the second confluence chamber is positioned between a joint of the first buffer channel connecting to the second confluence chamber and a joint of the second buffer channel connecting to the second confluence chamber; and wherein
    the fluid sample collection and retrieval apparatus further comprises:
    a buffer adjustment tube connecting to the buffer adjustment hole; and
    a fourth switch attached to the buffer adjustment tube, wherein the processor is further configured to activate the fourth switch independently from activating the first switch, the second switch and the third switch.

16. The fluid sample collection and retrieval apparatus of claim 14, wherein the connection channel comprises a plurality of longitudinal-particle-separation sections serially connected along an extending direction of the connection channel, each of the longitudinal-particle-separation sections comprises at least one winding portion and at least one shortcut portion, wherein the winding portion and the shortcut portion are connected in parallel between two joints at opposite terminals of the each of the longitudinal-particleseparation sections, and a path length of the winding portion is greater than a path length of the shortcut portion.

\* \* \* \* \*